(12) United States Patent
Thomas

(10) Patent No.: US 6,374,599 B1
(45) Date of Patent: Apr. 23, 2002

(54) COMPACT TUNED EXHAUST SYSTEM FOR AIRCRAFT WITH RECIPROCATING ENGINES

(75) Inventor: Robin G. Thomas, Ormond Beach, FL (US)

(73) Assignee: Power Flow Systems, Inc., Daytona Beach, FL (US)

(*) Notice: Subject to any disclaimer, the term of this patent is extended or adjusted under 35 U.S.C. 154(b) by 0 days.

(21) Appl. No.: 09/621,507

(22) Filed: Jul. 21, 2000

Related U.S. Application Data (60) Provisional application No. 60/145,386, filed on Jul. 23, 1999.

(51) Int. Cl.[7] ............................................... F02B 27/02
(52) U.S. Cl. ........................................... 60/312; 60/313
(58) Field of Search ........................ 73/118.1, 117.4; 60/312, 313

(56) References Cited

U.S. PATENT DOCUMENTS

| | | | |
|---|---|---|---|
| 3,967,446 A | * 7/1976 | Harralson et al. | 60/313 |
| 3,968,649 A | * 7/1976 | Edwards | 60/297 |
| 4,022,019 A | 5/1977 | Garcea | 60/282 |
| 4,134,377 A | * 1/1979 | Bamsey et al. | 123/119 |
| 4,302,407 A | * 11/1981 | Hartel et al. | 123/549 |
| 4,323,043 A | * 4/1982 | Alderson | 123/557 |
| 4,464,897 A | * 8/1984 | Yamane | 60/313 |
| 4,731,995 A | 3/1988 | McFarland, Jr. | 60/313 |
| 4,815,274 A | 3/1989 | Piatti | 60/313 |
| 4,835,965 A | 6/1989 | Poehlman | 60/313 |
| 4,869,063 A | 9/1989 | Sakurai et al. | 60/313 |
| 4,926,634 A | 5/1990 | Pütz et al. | 60/274 |
| 5,016,729 A | * 5/1991 | Linden | 60/313 |
| 5,050,378 A | 9/1991 | Clemmens | 60/313 |
| 5,072,583 A | 12/1991 | Urushihara et al. | 60/313 |
| 5,471,835 A | 12/1995 | Friedman | 60/293 |
| 6,216,447 B1 | * 4/2001 | Tikka | 60/298 |

* cited by examiner

*Primary Examiner*—Thomas Denion
*Assistant Examiner*—Diem Tran
(74) *Attorney, Agent, or Firm*—Brian S. Steinberger; Law Offices of Brian Steinberger, P.A (57) ABSTRACT

A tuned exhaust system for a multi-cylinder, reciprocating, internal combustion engine is disclosed. Each exhaust tube has approximately the same overall length resulting in a predetermined resonant frequency. The overall length includes the sum of the header tube length and the internal length of the collector assembly portions of the exhaust channels in the heat exchanger box. Calculating the correct length and bending the pipes to fit in the space available resulted in increased horsepower, reduced fuel consumption, cooler cylinder head temperatures, reduced noise and vibration for four-cylinder and six-cylinder aircraft engines.

2 Claims, 6 Drawing Sheets

COMPACT TUNED EXHAUST SYSTEM FOR AIRCRAFT WITH RECIPROCATING ENGINES

This invention relates to exhaust systems for reciprocating, multi-cylinder, internal combustion engines, and in particular to a method and apparatus for optimizing engine efficiency and performance; this invention also claims priority to U.S. Provisional Patent Application S. No. 60/145,386, filed Jul. 23, 1999.

BACKGROUND AND PRIOR ART

Exhaust systems for light aircraft have for the most part been designed without regard to tuning. Tuning is a characteristic of exhaust systems where the lengths and volumes of the different tubes are designed to resonate in harmony with the exhaust pulses so that a vacuum is formed at the exhaust port at critical times during the exhaust cycle. This is achieved by feeding all the headers to a collector, which allows the exhaust pulses to flow in an even manner, one at a time. Each one helps the one that follows it by leaving a vacuum in its wake. The length of each header must also be sufficient to prevent the sonic pulse from the next cylinder from creating a positive pressure wave before the exhaust valve of the subject cylinder closes.

Exhaust systems have been designed to improve engine performance for four-cylinder engines in cars by insulating exhaust pipes as discussed in U.S. Pat. No. 4,022,019; by tuning the exhaust manifold to match different engine speeds in U.S. Pat. No. 4,731,995; by installing partitioning walls into separate channels of a tailpipe to change the length of each exhaust channel in U.S. Pat. No. 4,815,274; by tuning exhaust systems for two-cycle engines with a Y-shaped hollow exhaust pipe in U.S. Pat. No. 4,835,965; by varying exhaust pipe configurations with valves and shafts coupled together for simultaneous rotation in U.S. Pat. No. 4,869,063 and in U.S. Pat. No. 5,072,583 a third exhaust passage is used to bypass two intermediate exhaust passages to lower exhaust loss at high engine speeds. Thus, it is known to make physical changes to exhaust systems in the form of insulation, partitions, uniquely shaped pipes, extra pipes, valves and couplings which increase engine production costs.

Chemical means for improving engine performance are discussed in U.S. Pat. No. 4,926,634 wherein a homogeneous exhaust gas mixture is produced using lambda controls and two catalysts; in U.S. Pat. No. 5,050,378 air or other gases from the exhaust are admitted to engine cylinders to effectively equalize header lengths and give an additional charge to each cylinder; and in U.S. Pat. No. 5,471,835 an exhaust control system is disclosed wherein tubes and one-way valves are arranged to permit air to be drawn into each pipe for more complete combustion of exhaust gases, thereby reducing emission and major pollutants. None of the references cited above specifically address aircraft engines, and only one reference, U.S. Pat. No. 4,815,274 supra, discloses an exhaust system, including a tailpipe insert designed for a confirmed space; such an insert would be a cost disadvantage.

The probable reason why aircraft exhaust systems have not been tuned, apart from lack of knowledge of the design techniques, is that the space available in the engine cowling is extremely limited, and the tubing lengths required are longer than could conveniently be fitted into the space available.

To compound the problem, the exhaust system has various other functions to perform, such as to attenuate the noise, to provide heat for the cabin, and to provide heated intake air for those engines using carburetors.

SUMMARY OF THE INVENTION

The first objective of the present invention is to configure predetermined lengths of exhaust channels to tune an engine.

The second objective of the present invention is to design a tuned exhaust system to fit within a limited space of an engine cowling.

The third objective of the present invention is to design a tuned exhaust system that provides ample heat to an aircraft cabin.

The fourth objective of the present invention is to design a tuned exhaust system that provides heated intake air for an engine carburetor.

The fifth objective of the present invention is to achieve engine performance gains which result in a shortened takeoff distance for aircraft, increased rate of climb to achieve cruising altitudes, added fuel efficiency, while maintaining cooler cylinder head temperatures.

The novelty of this invention relates to an arrangement of the exhaust tubes which allow them both to be tuned to the correct length and to fit in the limited space available, at the same time being able to provide ample cabin heat, carburetor heat and sound attenuation.

History of the invention: The concept was first tried on Apr. 14, 1998 at Daytona Beach International Airport, Florida on a Cherokee 140 aircraft. Refinements were made to the design through November 1998. A prototype exhaust system was displayed at Oshkosh AirVenture on Aug. 1, 1998. A Supplementary Type Certificate was applied for and granted by the Federal Aviation Authority (FAA) on Jan. 7, 1999. First product sold to the public on Mar. 13, 1999.

Further objects and advantages of this invention will be apparent from the following detailed description of a presently preferred embodiment, which is illustrated schematically in the accompanying drawings.

BRIEF DESCRIPTION OF THE FIGURES

FIG. 5 provides further detail on an exhaust system for a 6-cylinder engine.

FIG. 6 shows two side views of an aircraft with an indication of the engine and exhaust system location.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Although the conduits for exhaust gases herein are sometimes referred to "tubes" or "tubular", it is understood that the shape of the conduit is not limited in anyway, the shape could be square, oval, elliptical, or any known shape. The heat exchanger box accepts header tubes from each side. Thus, it is to be understood that the heat exchanger arrangement of this invention can be located under an engine, behind an engine or on the sides of an engine as will be explained herein. The location of the heat exchanger arrangement is similar for either a four-cylinder engine or a six-cylinder engine. The deciding factor for location is the space available.

In one embodiment of the invention, the engine is both four-cylinder and horizontally opposed. As mentioned above, the location of the heat exchanger box is governed by the available space, and will normally be placed ahead of the engine oil sump, transversely, and roughly centered below engine cylinders number 1 and 3. This means that cylinder one and three will have a relatively short distance to travel to reach the box, and therefore the internal tubing in the box for those cylinders will have to be long, so that the total length (the sum of the header tube length and the internal length of the tube inside the box) will approximate 102 centimeters (40 inches). Cylinder number four is the furthest back, and therefore its header tube will naturally be the longest, so the internal tube in the box will have to be short. Cylinder number two will be almost directly over the box, so it requires special treatment externally to the box so that the total length is identical to the other three tubes and the internal length matches the length of tubes inside the collector.

The lengthening of the number two header is achieved partly by putting its entry point to the box lower down, and partly by extending the header down of back further than it would need to go, and bringing it back again by means of a U turn. In this manner the internal tubing can be paired at the same length, despite the difference in the length of exhaust headers outside of the heat exchanger endplates. Note that in this arrangement, the tubing internal to the heat exchanger box will have to be the same length for cylinders number 2 and 4, so the header tubes on that side will also have an identical length and will be curved in wider and narrower U shapes prior to entering the endplate wall of the heat exchanger box.

Another consideration is that the collector must exit the box at one side or the other, not close to the middle. This is so because there is normally an undercarriage leg in the middle of the fuselage in back of the box, and the exhaust should not exit right in front of the undercarriage leg. Exiting directly in front of the undercarriage leg would cause problems such as heat and corrosion of the undercarriage leg.

Taking all the above factors into account, it has been determined that the best way to arrange the tubes is as depicted in the drawings, as all the above problems are solved. The resultant dimensions of the box are entirely compatible with the space available, all the tubes can be made the exact tuned length desired before reaching the collector, there is ample provision for cabin and carburetor heat, the exhaust tube exits well over to one side, and silencing can be achieved as necessary by using a muffler on the tail pipe.

Whereas the above describes the preferred embodiment of the invention, it is possible to obtain a similar effect by altering the arrangement in one of several ways: The whole layout can be turned 180 degrees, left to right, or the arrangement of the pipes in the box could be changed, so that instead of the two pipes from one side being in the center, and the other two on the outside, they could be alternated so that for instance, number 1 cylinder could be in front, number two next, number three next, and number four last. This arrangement is also envisioned in this design.

Another embodiment of the present invention is a tuned exhaust system for six-cylinder engines. Aircraft with more than 200 horsepower (HP) are normally equipped with six-cylinder engines. In other respects the engines are identical to those described above, and the exhaust systems currently in use suffer from the same problems as the four-cylinder engines. However, the solutions are different, because the interaction between cylinders occurs every hundred and twenty degrees of crankshaft rotation instead of every one hundred and eighty degrees as in the four cylinder engines. Thus cylinders firing in sequence must have at least 152 centimeters (60 inches) instead of approximately 102 centimeters (40 inches) of header tube. This may be unmanageable. The solution is to split the exhaust system into two parts, each part serving only three cylinders. In this manner, the minimum header length can be reduced to approximately 76 centimeters (30 inches).

In some aircraft there is no suitable space available for the exhaust collector boxes to be placed transversely. Thus, as would be understood by someone skilled in the art, the exhaust system can be nestled compactly inside the engine cowl by shaping the three exhaust channels into a variety of S-curves and an inverted C-curve, as required, before the channels enter the 3-into-1 collector on each side of the engine. The 3-into-1 collector is located in between the engine exhaust ports and serves to direct the exhaust gases away from the engine cowl into the tailpipe.

To make the system as compact as possible, the three cylinders on one side cross under the engine to the opposite side and vice versa. The cabin heat and carburetor heat boxes are located under the engine in the area where there are six tubes crossing from one side to the other.

The heat exchangers are similar to the ones used on four cylinder engines, and the adjustment of the lengths of the headers is achieved in a similar manner.

Figure 1:
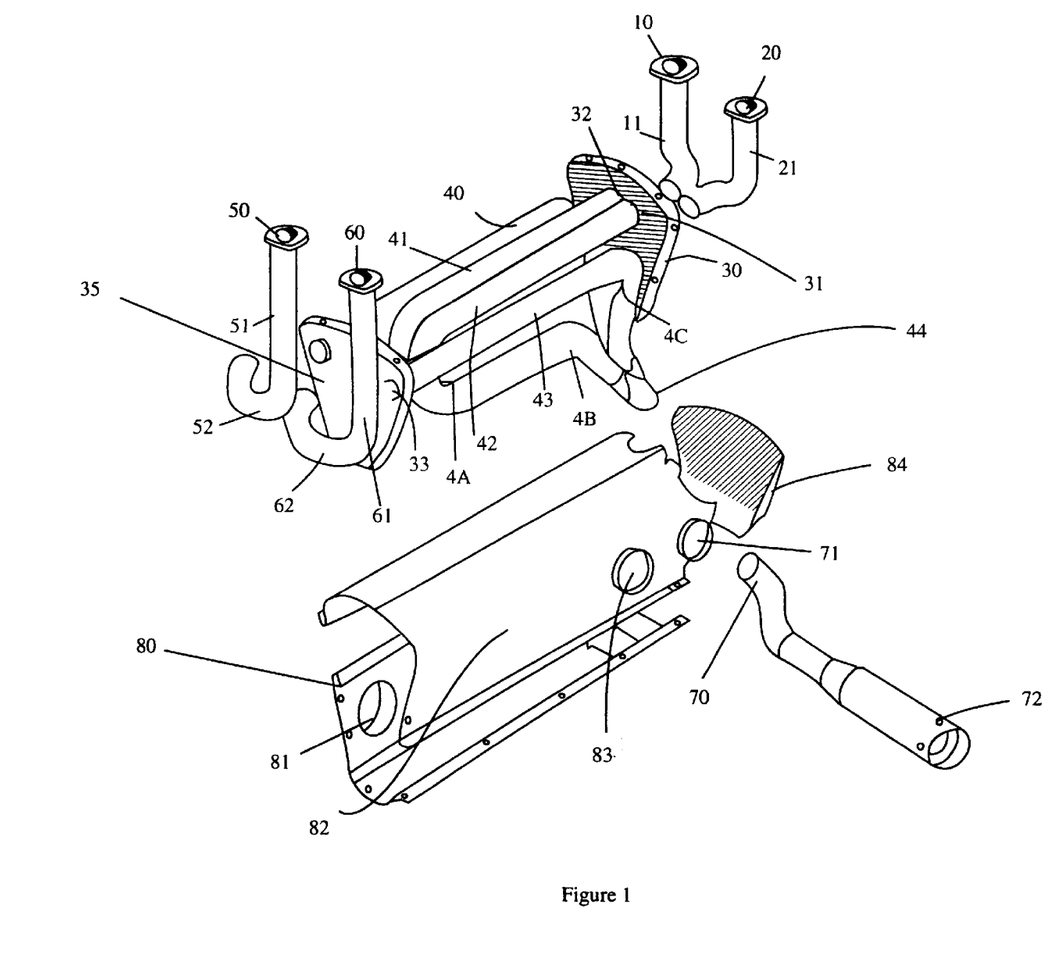
FIG. 1 is an exploded view of the exhaust system for a four-cylinder engine.

Further details are now disclosed in the discussion of the Figures. In FIG. 1, the exhaust headers 10, 20, 50, 60 are designed for attachment to engine exhaust ports (not shown) of a four-cylinder engine. Extending from each header is a trajectory or portion of the exhaust channel 11, 21, 51, 61 that is positioned outside of the heat exchanger box endplates 30, 35. One set of two exhaust channels 11, 21, with exhaust headers 10, 20, are routed through a heat exchanger box endplate 30, at points of entry 31, 32, then down the center (41, 42) of the collector assembly 45, traversing the distance to the opposite endplate 35. After reaching endplate 35, exhaust channels 41, 42 turn through an angle, A of approximately 180 degrees and then traverse a distance toward endplate 30 before being bent at an angle, B of approximately 70 degrees, thereby forming one set of two exhaust channels 41, 42 that feed into an exit portion 44, of the heat exchanger arrangement. The exit portion 44 is also known as the collector. The collector is subsequently connected to a tailpipe 70, fitted with a muffler 72.

A second set of two exhaust channels 51, 61 with exhaust headers 50, 60 are shaped with turns having a U-shape and then routed through the heat exchanger box endplate 35, at points of entry 33, 34, into collector assembly 45. The trajectory of channels 51, 61 is of a greater length than the trajectory of channels 11, 21. Exhaust channels 40, 43 traverse the distance to the opposite endplate 30, on a parallel plane flanking either side of channels 41, 42. After reaching endplate 30, exhaust channels 40, 43 are turned through an angle, C that can range from approximately 85 degrees to approximately 90 degrees to form a second set of two exhaust channels that empty into a single collector 44. The collector 44, is a 4-into-1 collector.

FIG. 1 also includes an exploded view of the heat exchanger box, which is constructed of heavy gauge aluminum. When the front shroud 80 and the rear shroud 82 are joined the box is formed. Opening 81 in the shroud is the air intake port for the engine and opening 83 is the port for conducting hot air (heat) into the aircraft cabin. The exhaust tube 70, fits into orifice 71, and communicates directly with the exhaust channels 40, 41, 42, 43 which empty into collector 44. The exhaust tube 70, is sometimes identified as a tailpipe and is connected to collector 44 on one end and fitted with a muffler assembly 72 on the opposite end to attenuate sound and vibrations of the exhaust system. A carburetor heat shroud 84, is preferably attached to the end of the heat exchanger arrangement at the end adjacent to the engine carburetor.

The overall shape of the heat exchanger arrangement is wider to the first side to accommodate four exhaust channels in the collection assembly and narrower to the second side opposite the first side to accommodate two exhaust channels. Stated succinctly, the heat exchanger chamber is wider at the top and narrower at the bottom or wider at the bottom and narrower at the top where the exhaust channels empty into the collector. The total length of each exhaust channel is approximately 102 centimeters (40 inches). The shape of the heat exchanger box is not critical to the present invention, the critical factor is the space available to accommodate the length of exhaust channels for a tuned exhaust system. Thus, an irregular shape having protruding sections is acceptable.

Figure 2:
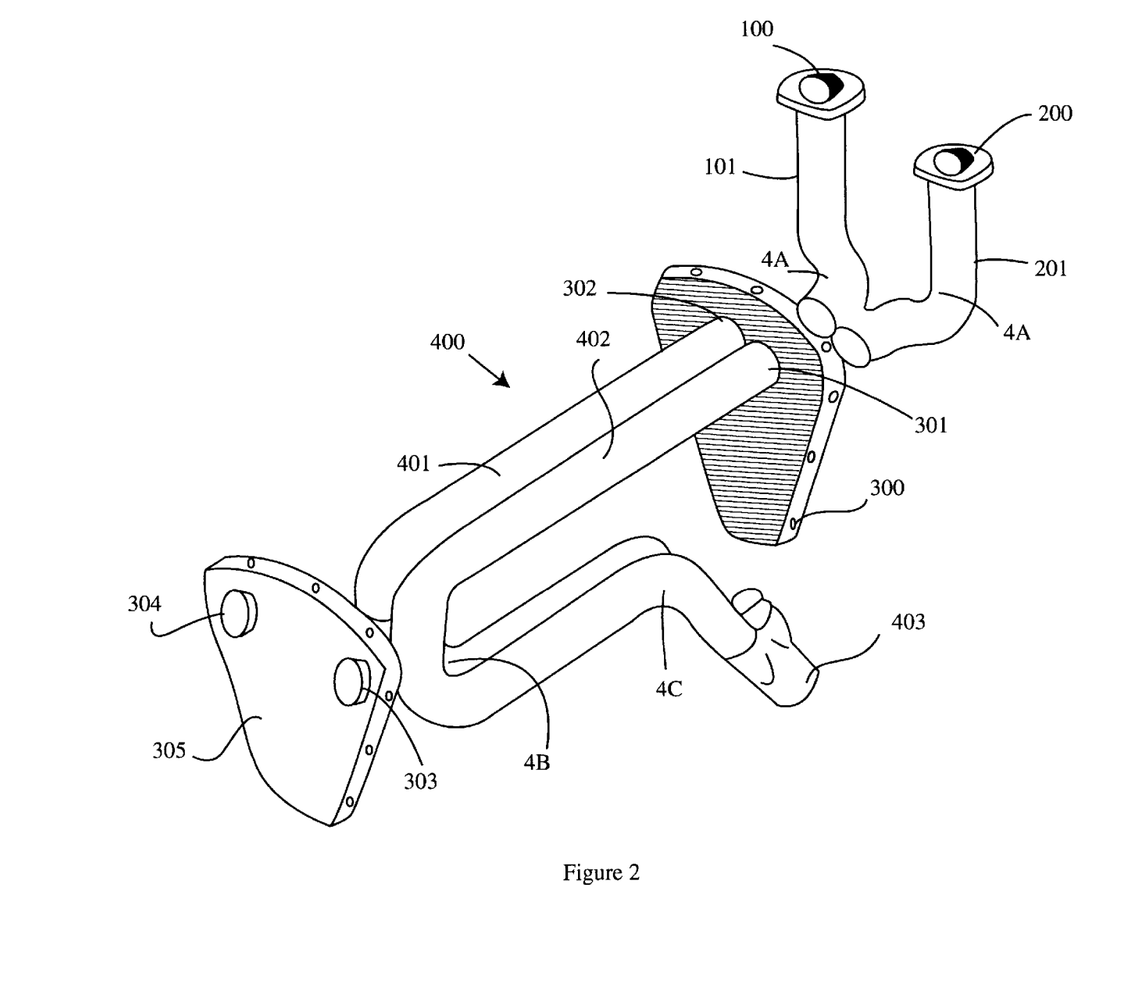
FIG. 2 is the routing of the exhaust tubes leading from cylinders on one side of the engine. These tubes have short trajectory headers with relatively long tubes inside the collector.
Figure 3:
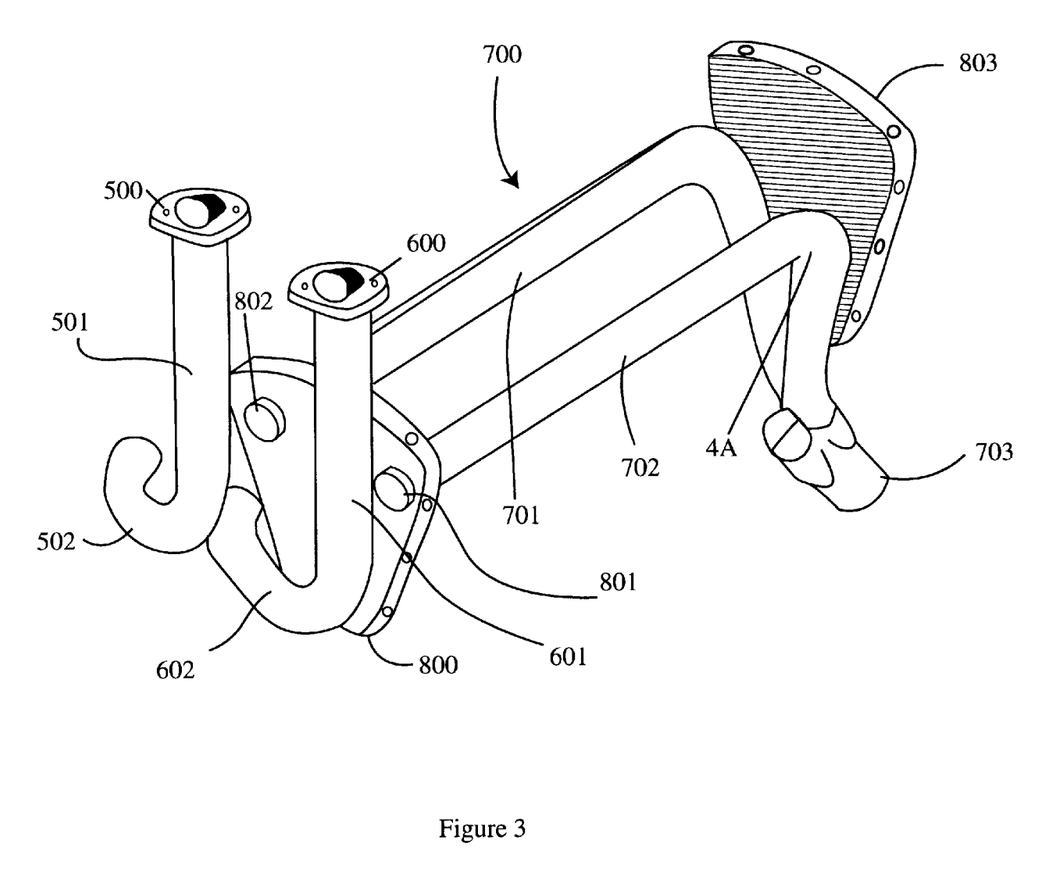
FIG. 3 is the routing of the exhaust tubes leading from cylinders on a second side of the engine. These tubes have long external headers and relatively short tubes inside the collector.

FIGS. 2 and 3 are enlarged views of exhaust channels categorized as having short trajectories and long trajectories wherein the total length of each channel, prior to emptying into the collector, is approximately identical. In FIG. 2, one set of two exhaust headers 100, 200 are designed for attachment to engine exhaust ports (not shown). Extending from each header is a short trajectory 101, 201 that bends at an angle A, of approximately 90 degrees before being routed through heat exchanger endplate 300, at entry points 301, 302. After entering the collector assembly 400, the set of two exhaust channels 401, 402 traverse the distance to the opposite endplate 305. After reaching endplate 305, exhaust channels 401, 402 bend at an angle B, of approximately 180 degrees and then traverse a distance toward endplate 300 before being bent at an angle C, of approximately 70 degrees thereby forming one set of two exhaust channels 401, 402, that feed into an exit portion 403, of the heat exchanger arrangement. The exit portion 403, is also know as a collector which accommodates four exhaust channels. Endplate 305 contains entry ports 303, 304, for a second set of two exhaust channels.

FIG. 3 shows a second set of two exhaust headers 500, 600 designed for attachment to engine exhaust ports (not shown). Extending from each header is a trajectory exhaust channel 501, 601, that is greater in length than the trajectory of the exhaust header assembly shown in FIG. 2; the exhaust channels in FIG. 3 are hereinafter called, the long trajectory.

In FIG. 3, the long trajectory of exhaust channel 501, bends into a U-turn 502 before communicating directly through the endplate 800, at entry point 802 leading to the collector assembly 700. The long trajectory of exhaust channel 601, bends in a U-turn 602, which is wider than U-turn 502, before communicating directly through endplate 800, at entry point 801 leading to the collector assembly 700. Thus, the second set of exhaust channels having long trajectories must have a unique series of bends and turns to fit in the limited space available and permit an internal arrangement of channels having an identical length in the heat exchanger box. Exhaust channels 701, 702 traverse the distance to the opposite endplate 803, and are then bent at an angle A, that can range from approximately 85 degrees to approximately 90 degrees, preferably 90 degrees, to form a second set of two exhaust channels that empty into a single, 4-into-1 collector 703.

Figure 4:
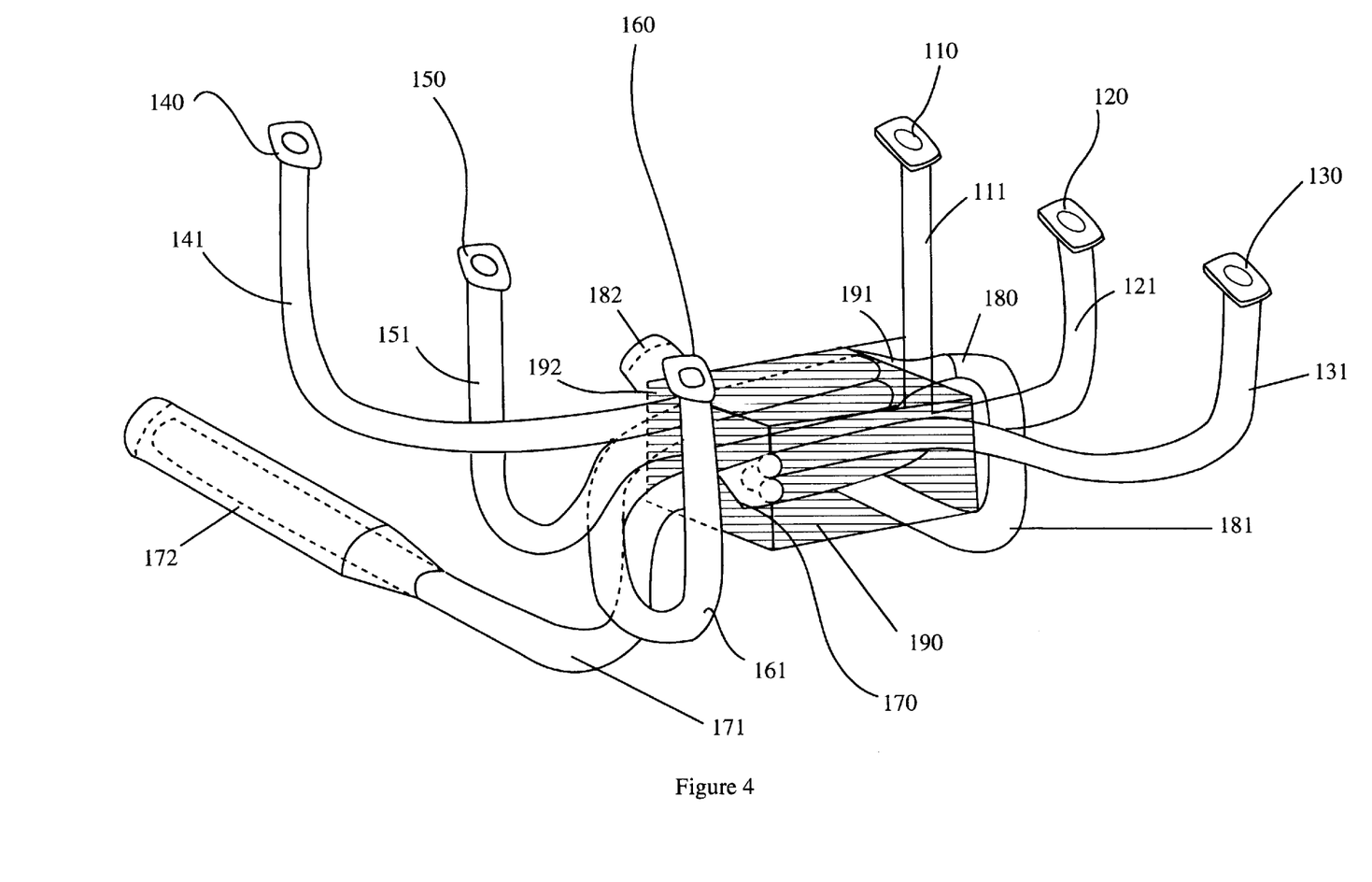
FIG. 4 is a routing of exhaust tubes for a 6-cylinder engine.

FIG. 4 shows an exhaust system for a six-cylinder engine wherein one set of three exhaust headers 110, 120, 130 having a first trajectory 111, 121, 131 on one side of a heat exchanger arrangement that communicates directly through one endplate 191 of the heat exchanger box 190, passes adjacent to the engine (not shown) and traverses a distance to the one endplate 192, prior to exiting through the exit portion 170, of the heat exchanger box on the one side, forming a set of three exhaust channels 111, 121, 131 emptying into a 3-into-1 collector 170, connected to tailpipe 171. Tailpipe 171 is connected to the exit portion 170 of the heat exchanger on one end and connected to a muffler 172 at the opposite end. A second set of three exhaust headers 140, 150, 160 having a second trajectory 141, 151, 161 on the opposite side of the heat exchanger arrangement. The second trajectory 141, 151, 161 has a greater length than the first trajectory 111, 121, 131. The second trajectory 141, 151, 161 communicates directly through the endplate 192 of the heat exchanger box 190, passes adjacent to the engine (not shown), and traverses a distance to the one endplate 191, prior to exiting through the exit portion or collector 180 of the heat exchanger box 190 on the one side, forming a second set of three exhaust channels 141, 151, 161, emptying into a second 3-into-1 collector 180, connected to tailpipe 181. Tailpipe 181 is connected to the exit portion 180 of the heat exchanger box 190 on one end and connected to a muffler 182 on the opposite end. The total length of each exhaust channel is approximately 76 centimeters (30 inches).

Figure 5A:
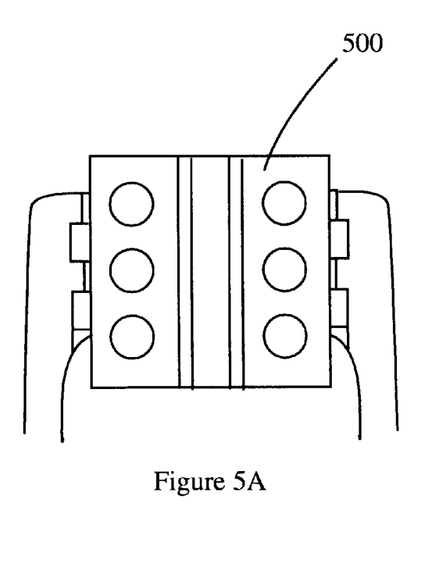
FIG. 5A shows the exhaust connections to a 6-cylinder engine.
Figure 5B:
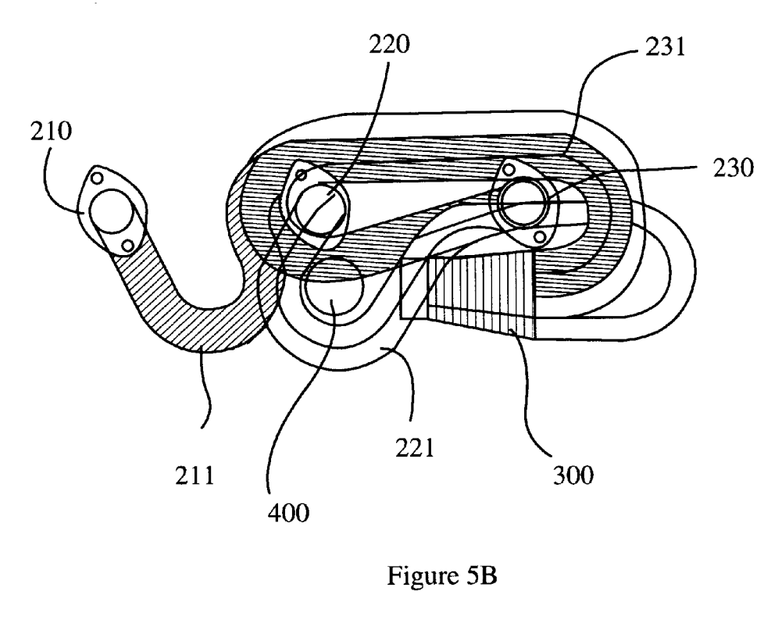
FIG. 5B is a top view of a compact arrangement of exhaust channels on one side of a 6-cylinder engine.

FIG. 5 shows another embodiment of a compact, novel exhaust system for a six-cylinder engine. FIG. 5A shows exhaust connections to two sides of a six-cylinder engine 500. FIG. 5B is a top view of three-cylinders on one side of a six-cylinder engine. The opposite side of the engine has an exhaust arrangement very similar to that described below, except the tailpipe extends 180 degrees in the opposite direction. Exhaust headers 210, 220, 230 are connected to exhaust channels 211, 221, 231 that are configured to empty into a 3-into-1 collector 300 on one side of the engine. The collector 300 is positioned in between the engine exhaust ports inside the engine cowl.

Exhaust channel 211 is configured into a wide S-curve before connecting to the collector 300. Exhaust channel 221 is configured into a flat S-curve before connecting to the collector 300. Exhaust channel 231 is bent into an inverted C-curve before it is connected to collector 300. The 3-into-1 collector 300 then directs the exhaust gases away from the engine cowl into the opening for the tailpipe connection 400.

Figure 6A:
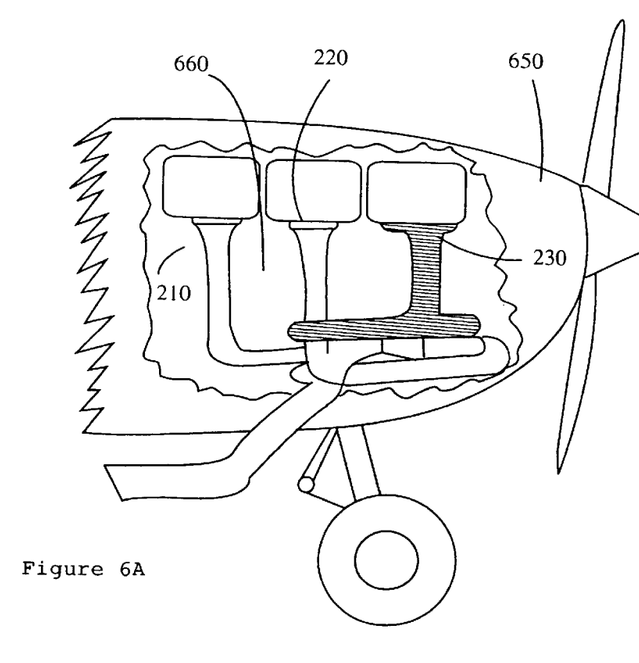
FIG. 6A is a representation of a 4-cylinder engine.
Figure 6B:
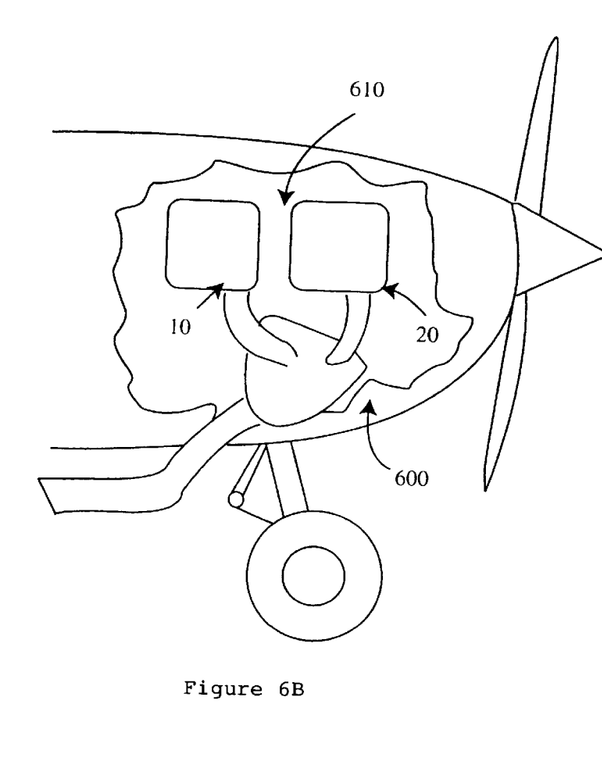
FIG. 6B is representation of a 6-cylinder engine.

FIG. 6 contains two side views of the front end of an aircraft. In 6A, front end 600 has a four-cylinder engine 610 with exhaust headers 10, 20 as shown in FIG. 1. In 6B, the front end 650 contains a six-cylinder engine 660 with exhaust headers 210, 220, 230 as shown in FIG. 5.

The exhaust system that is the subject of this patent application has been tested on aircraft as well as on a dynamometer. The comparison was between the performance of a Lycoming 150 horsepower (HP) engine having the tuned exhaust system of the present invention installed in a Cessna 172 aircraft, designated as "Power Flow" in the chart below, and a standard exhaust system for a Cessna 172 aircraft, designated as "CESSNA" in the chart below.

Tests were conducted by Ly-Con Aircraft Engines, 8231 West Doe Avenue, Visalia, Calif. 93291. Test results are shown in the table below:

|  | Power HP | Fuel Flow gal./hr | Fuel Efficiency lb./hp/hr | *CHT cyl. temp | **EGT spread |
|---|---|---|---|---|---|
| CESSNA | 133.3 | 16.4 | .755 | 280° F. | 122° |
| POWER FLOW | 157.1 | 16.8 | .649 | 281° F. | 61° |
| GAIN | 23.75 |  |  | −62° F. | 61° |
| % Change | 17.8% |  | +14% | −22% | 50% LESS |

*CHT = Cylinder Head Temperature
**EGT = Exhaust Gas Temperature

The Power Flow engine developed 23.75 more horsepower and was able to reduce fuel consumption by up to 3.6 gallons per hour. The cylinder head temperatures show a reduction up to 62 degrees Fahrenheit (F), which would result in a longer engine life. The exhaust gas temperature is defined as the temperature spread between the hottest and the coldest cylinder. The smaller the spread, the better because cylinder burn out is diminished. The chart shows that the Power Flow engine reduced the spread by one half resulting in greater fuel savings and less engine wear.

The test results above also confirm better performance of an aircraft having the tuned exhaust system of the present invention. For example, when taking off and climbing at full throttle, there will be more revolutions per minute (RPM), in a range of from 50 RPM to 150 RPM. The additional engine revolutions give more power, thus allowing a takeoff run that is shorter by approximately 300 feet and a more rapid rate of climb of approximately 200 feet per minute.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teaching herein are particularly reserved especially as they fall within the breadth and scope of the claims here appended.

I claim:

1. A method for tuning a sound attenuated, exhaust system of a four-cylinder aircraft engine to improve engine performance and reduce fuel consumption comprising the steps of:

a) determining a total length for each exhaust channel;

b) positioning one set of two exhaust channels with headers having a first trajectory on one side of the heat exchanger arrangement which communicates directly through one endplate of the heat exchanger box and traverses a distance to an opposite endplate on an opposite side prior to bending the first set of two exhaust channels approximately 180° to reverse the direction of each channel and subsequently directing each channel downward, at an angle of approximately 70°, into the exit portion of the heat exchanger box on the one side, forming one set of two exhaust channels;

c) positioning a second set of two exhaust channels with headers having a second trajectory, the second trajectory having a greater length than the first trajectory, on the opposite side of the heat exchanger arrangement, the headers having a second trajectory are bent into a U turn before communicating directly through the opposite endplate of the heat exchanger box and traversing a distance to the one endplate prior to being bent approximately 90° in the direction of the exit portion of the heat exchanger box on the one side, forming a second set of two exhaust channels;

d) creating an exit portion of the heat exchanger box wherein both the first set of exhaust channels and the second set of exhaust channels empty into a single collector; and e) adding an exhaust tube having a muffler connected to the single collector for noise attenuation.

2. A method of claim 1, wherein the heat exchanger arrangement is wider to a first side to accommodate four exhaust channels in the collection assembly and narrower to the second side opposite the first side to accommodate two exhaust channels.

* * * * *